INVENTOR.
MAURICE J. BARTELL
BY
ATTORNEYS

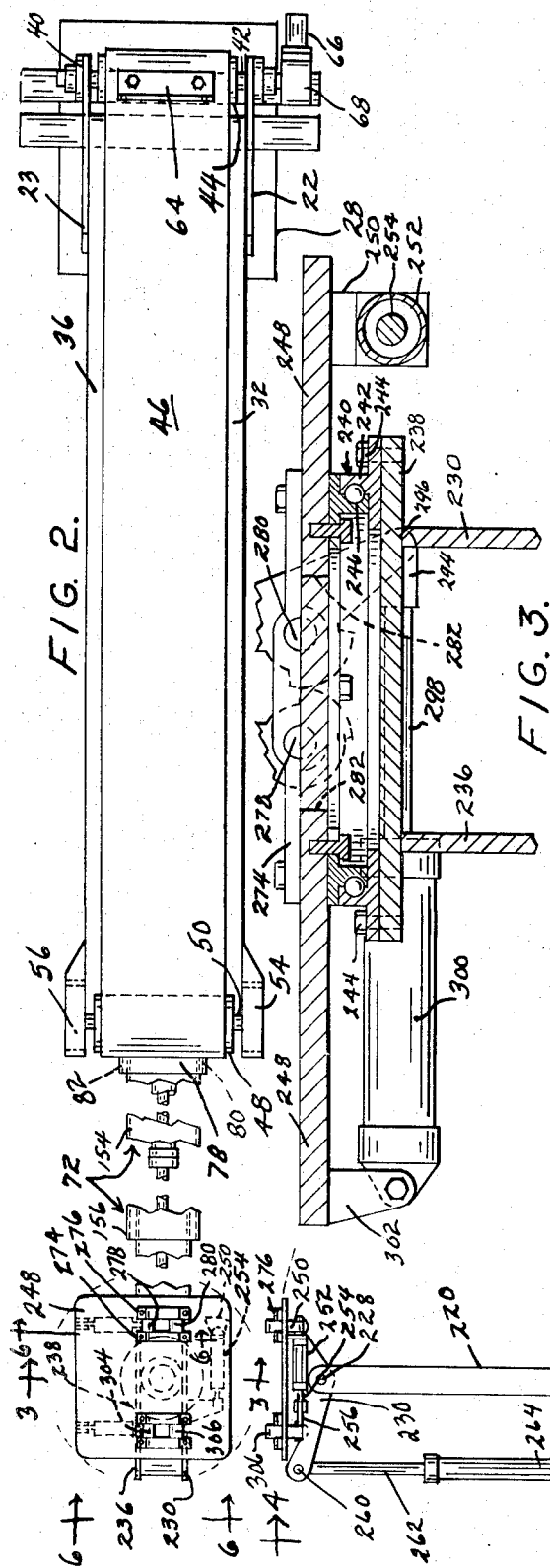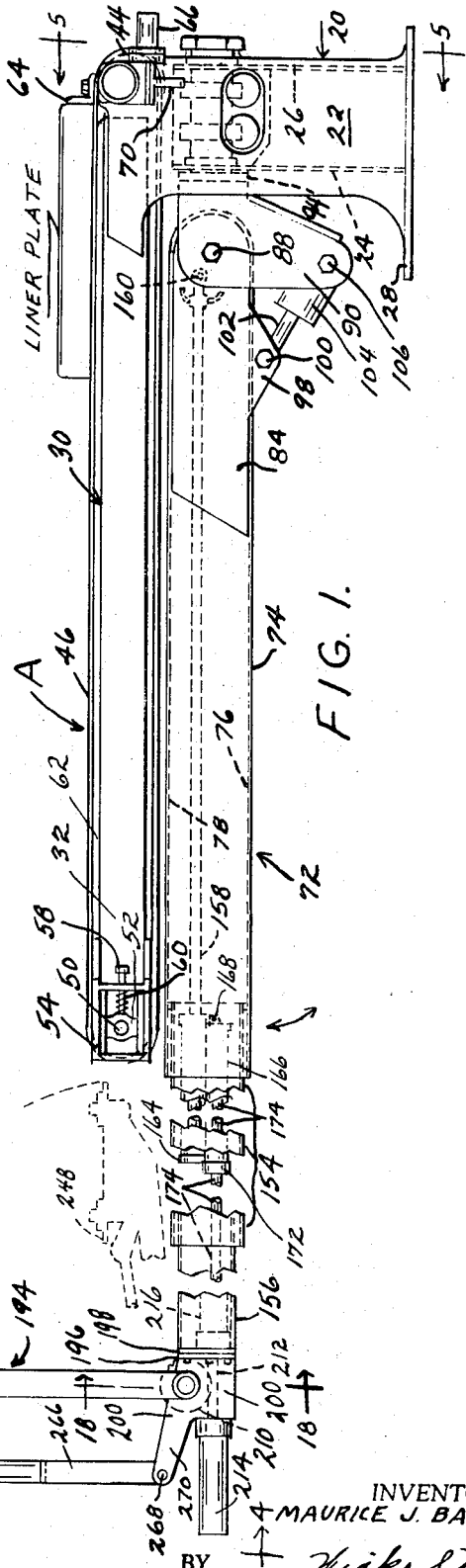

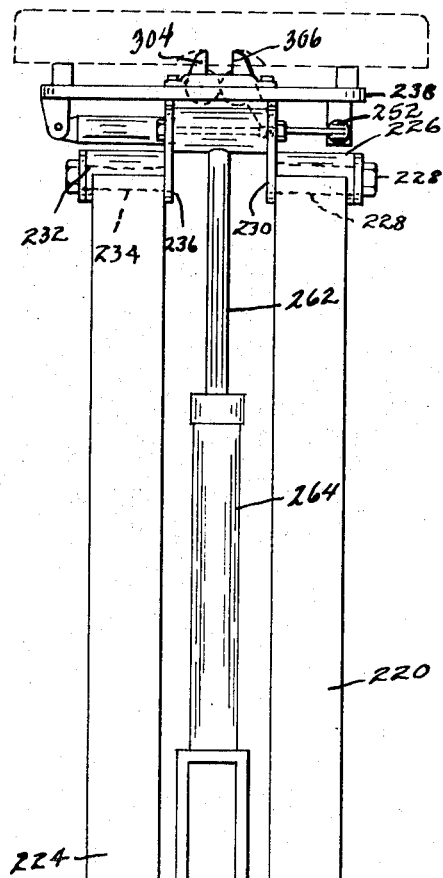
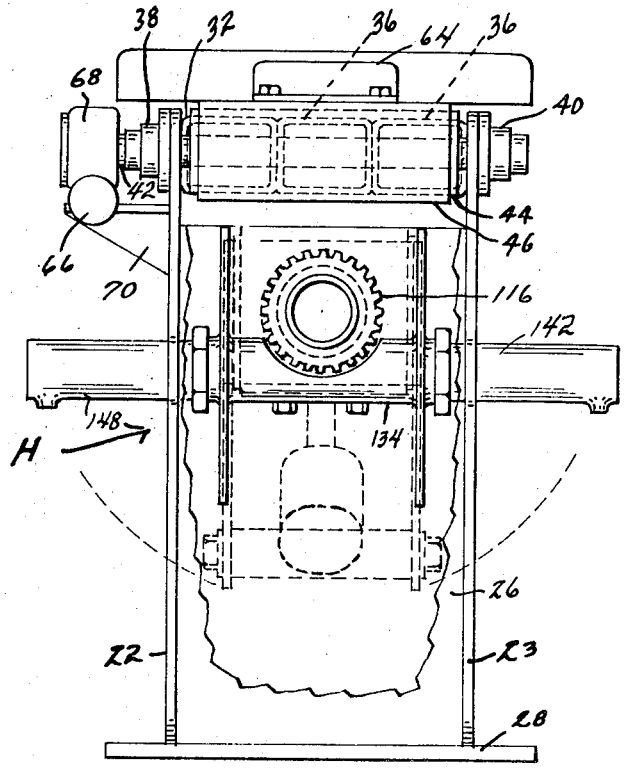
FIG. 5.
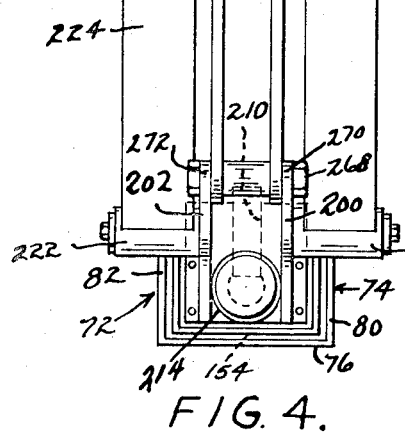
FIG. 4.
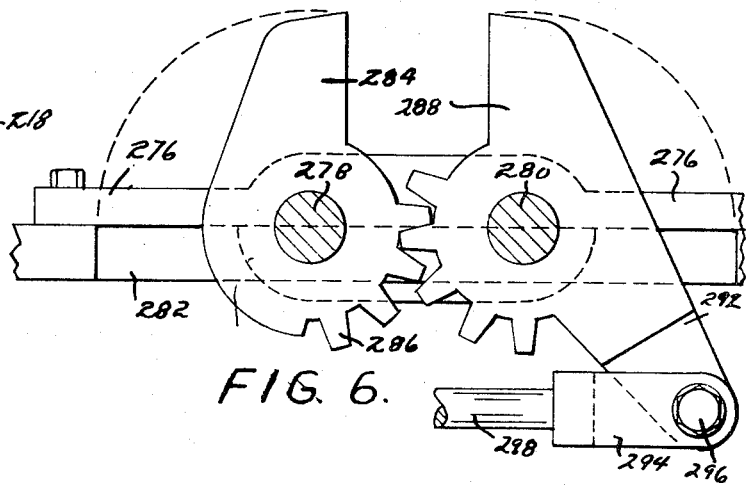
FIG. 6.
INVENTOR.
MAURICE J. BARTELL
BY Hicks & Nemer
ATTORNEYS INVENTOR.
MAURICE J. BARTELL
BY Hicks & Nemer
ATTORNEYS

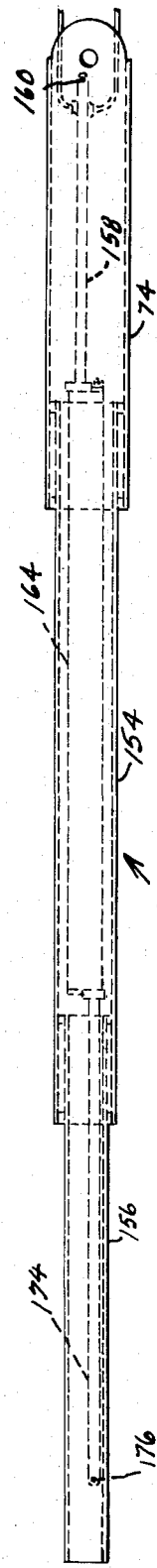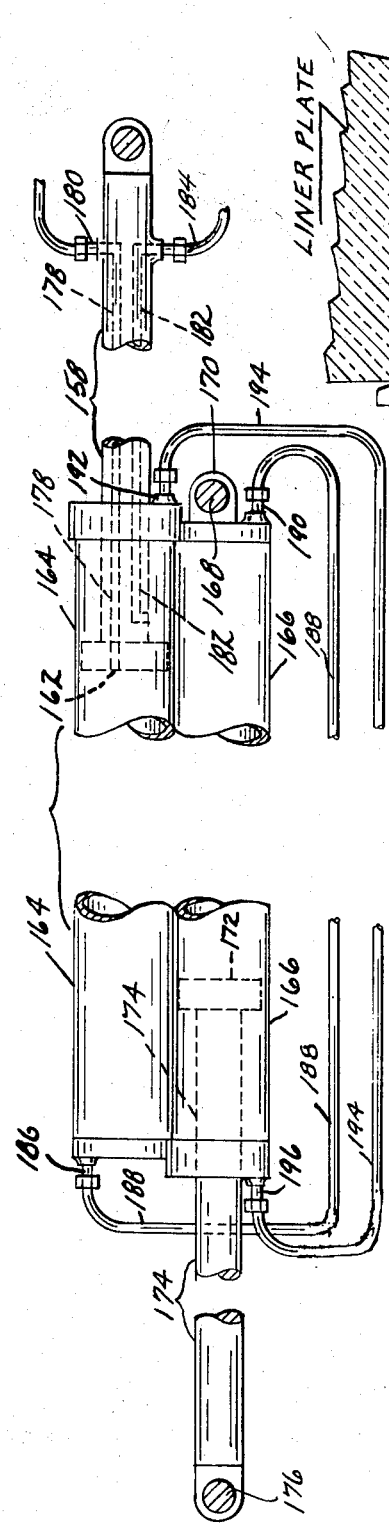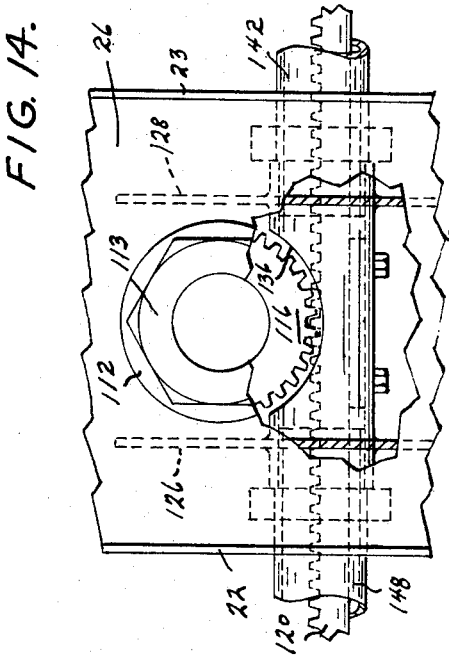

United States Patent Office 3,716,153
Patented Feb. 13, 1973

3,716,153
DEVICE FOR POSITIONING LINER PLATES UPON THE INTERIOR SURFACE OF A DRUM FOR SECUREMENT THERETO
Maurice J. Bartell, Duluth, Minn., assignor to Barko Hydraulics, Inc., Duluth, Minn.
Filed Oct. 20, 1971, Ser. No. 190,970
Int. Cl. B66b 17/00
U.S. Cl. 214—91
19 Claims

ABSTRACT OF THE DISCLOSURE

A device for positioning liner plates upon the interior surface of a drum for securement thereto which includes a support having a telescopic boom mounted thereon for extension into a drum, a platen on which is secured a liner plate, an elevating arm on which the platen is mounted with a gear and rack for moving the elevating arm, gear and rack means for rotating the boom on its longitudinal axis together with a hydraulic ram for pivoting the boom on the support, a ram for tilting the platen relative to the elevating arm, the platen being rotatable on the elevating arm with a hydraulic ram for rotating the platen and an endless belt mounted on the support for conveying a liner plate to the platen.

SUMMARY

The invention relates to an improvement in a device for positioning liner plates upon the interior surface of a drum for securement thereto. It is an object of the present invention to provide a device having a support for an extendable boom on the outer end of which is mounted a tilting and elevating arm on which is mounted a platen upon which is mounted a liner plate delivered from a conveyor belt extending from a point without the drum to a point within the drum. The conveyor belt is mounted on the support for the boom. The platen may be swiveled to align the plate with holes in the wall of the drum. The support for the device is anchored exteriorly of the drum, the boom and supported platen being extended through an opening in the drum, the device controlled by controls operated by an operator within the drum.

Prior to the above invention, liner plates for a drum were aligned with holes in the drum by extending cables from an overhead crane through the bolt holes in the drum and connected to the liner plates. The crane operator had to hoist the liner plate by means of signals relayed from an operator in the drum. In this type of operation the crane operator, unable to observe the precise hoisting motion of the crane upon the plate against the drum wall, could easily overstress the cables and thereby break the cables with the result that the liner plate would fall within the drum with possible great danger to the operator within the drum. This is due to fact that the liner plates run up to some 1500 pounds per plate. With the present device no cables are used, and the operator within the drum controls the positioning of the plate on the wall of the drum with the positive holding of the plate on the platen and positive control of the movement of the plate for alignment with the holes in the drum. The device also provides conveyor means for placing a liner plate on the platen within the drum from a point without the drum. With the present device liner plates may be secured to 180 degrees of the interior area of the drum without rotating the drum. The remaining 180 degrees of the area is done with one rotation of the drum of 180 degrees. With the holding of liner plates in position by cables from a crane as described hereinbefore, only two rows of liner plates could be secured without rotating the drum which also necessitated removing the operator from within the drum. Also with the present device the number of operators required to reline a drum has been substantially reduced and down time of the drum has also been reduced.

Figure 7:
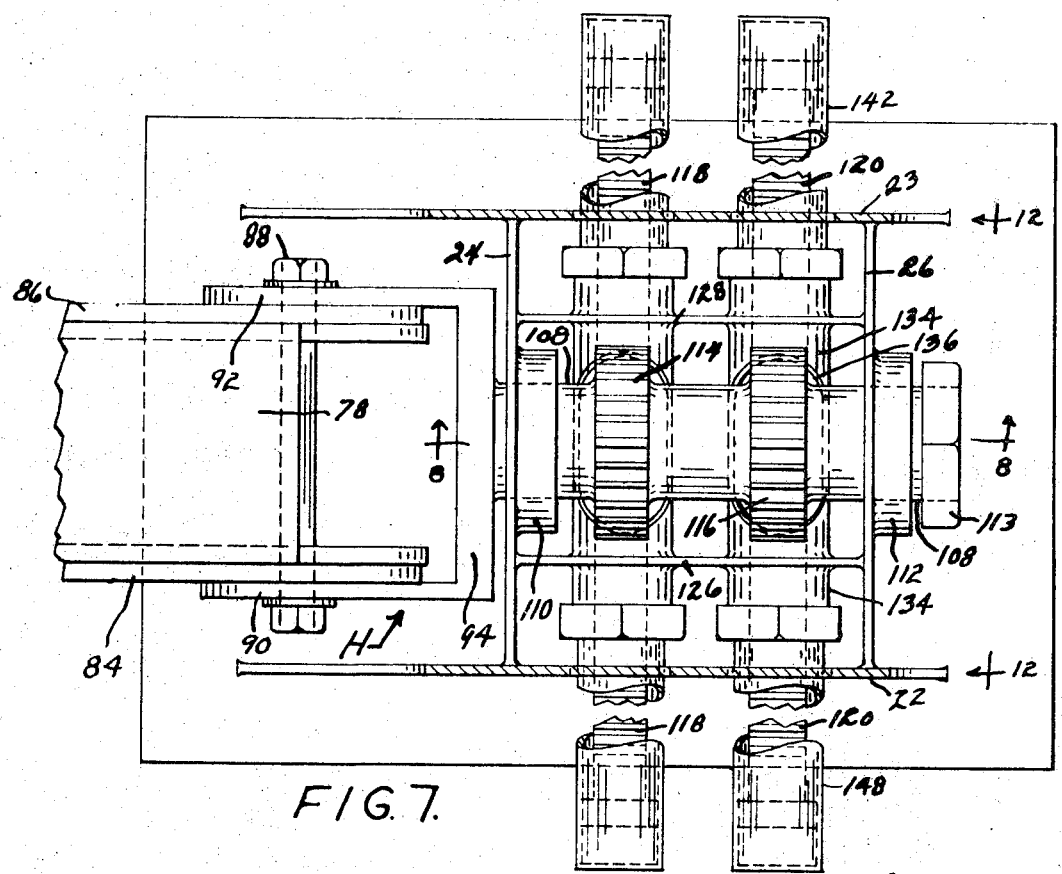
Figure 8:
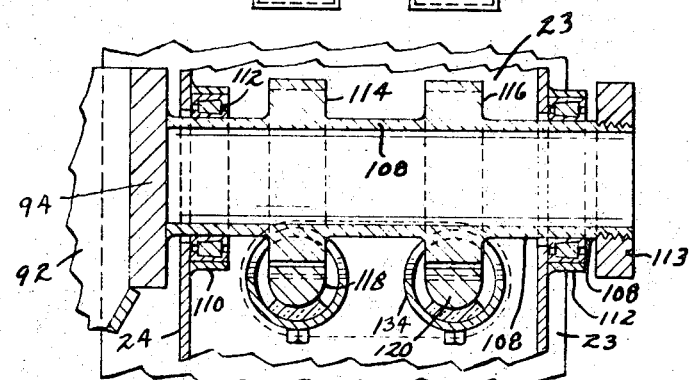
Figure 9:
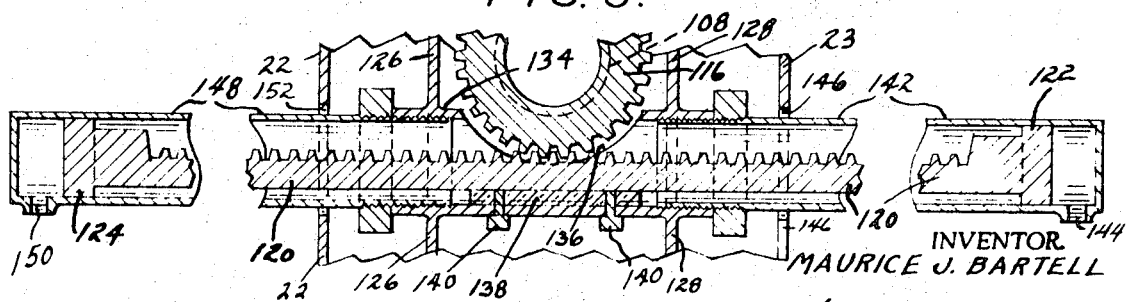
Figure 11:
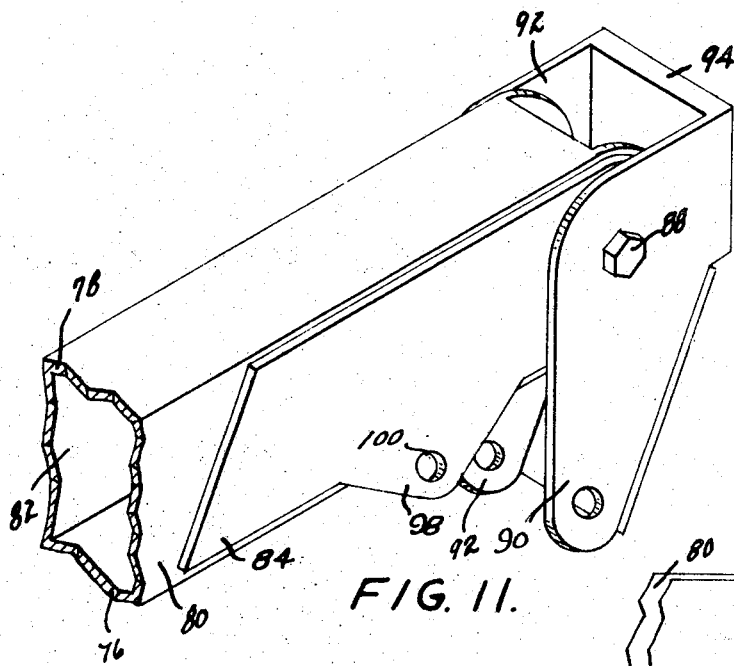
Figure 10:
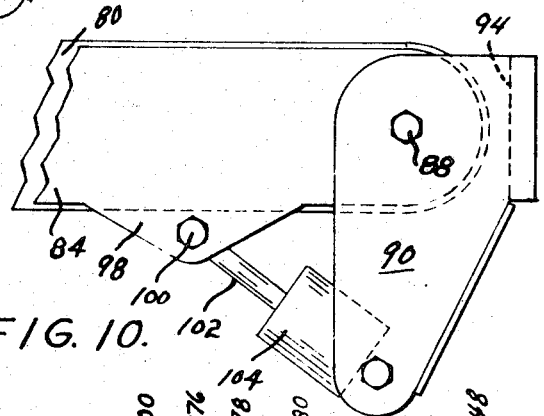
Figure 18:
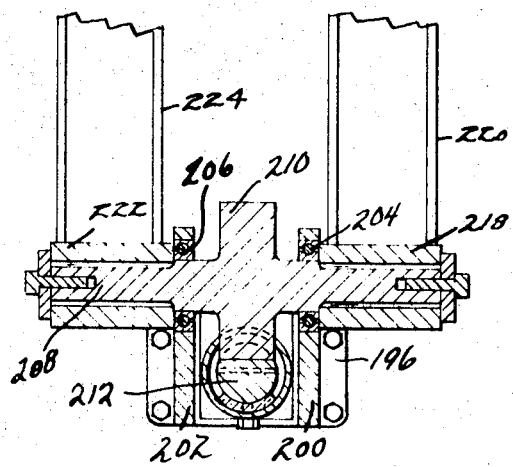
Figure 17:
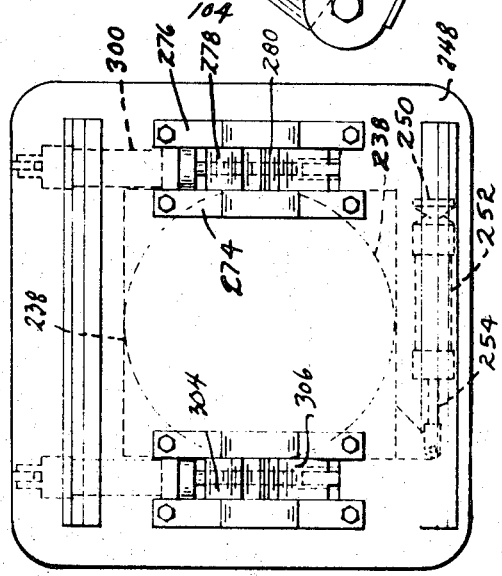

In the drawings forming part of this application:
FIG. 1 is a side elevational view of a device for installing liner plates in a drum embodying the invention with the platen in an extended upright position.
FIG. 2 is a top plan view of the device portions of which are broken away.
FIG. 3 is a sectional view on the line 3—3 of FIG. 2.
FIG. 4 is a view on the line 4—4 of FIG. 1.
FIG. 5 is an end view of the device on the line 5—5 of FIG. 1, a portion of which is broken away.
FIG. 6 is a view on the line 6—6 of FIG. 2.
FIG. 7 is a sectional view on the line 7—7 of FIG. 1.
FIG. 8 is a sectional view on the line 8—8 of FIG. 7.
FIG. 9 is a sectional view on the line 9—9 of FIG. 7.
FIG. 10 is a detailed fragmentary view of the boom head.
FIG. 11 is a further fragmentary view of the boom head.
FIG. 12 is a view on the line 12—12 of FIG. 7 with portions thereof broken away.
FIG. 13 is a side elevational view of the telescoping boom in extended position.
FIG. 14 is a detailed arrangement of the dual hydraulic mechanism for telescoping the boom sections.
FIG. 15 is a fragmentary view of platen with a drum liner plate secured thereon and shown in sections.
FIG. 16 is a view similar to that of FIG. 15 with a different type of a drum liner plate.
FIG. 17 is a top plan view of the platen.
FIG. 18 is a sectional view on the line 18—18 of FIG. 1.

Referring to the drawings in detail, the device for installing liner plates in a drum A includes the stationary support frame 20 having the first sidewall 22 and a second sidewall 23 spaced from the first sidewall. The sidewalls are connected by the front wall 24 and the spaced rear wall 26. The sidewalls and front and rear walls are mounted on a common base plate 28. The base plate 28 is securely anchored to the floor of the building in which the device is operated.

As a part of the frame 20 is the conveyor support 30 which includes a first elongated member 32 welded at its rear end to the inner surface of the upper portion of the first sidewall 22. An intermediate elongated member 34 is welded to the first elongated member and a second elongated member 36 is welded to said intermediate member 34 and to the inner surface of said second sidewall 23 to form one integral horizontal support.

CONVEYOR

Mounted on the upper ends of the sidewalls 22 and 23 by means of bearings 38 and 40 is the driven shaft 42 which mounts the rear belt pulley 44 upon which the conveyor belt 46 is mounted. The front end of the belt 46 is mounted upon the take-up pulley 48 mounted on a shaft 50. The shaft 50 is mounted in the pair of take-up bearings 52 mounted in pairs of slide rails 54 and 56. The pulley 48 is urged forwardly against the belt by means of a pair of take-up adjusting bolts 58 positioned against the bearings with the pulleys urged by springs 60 mounted on the bolts 58. A sheet of non-friction material 62 is secured to the top of members 32, 34, and 36 which make up the conveyor support 30 to reduce friction between the belt and the support. A carrying lug 64 is secured to the outer surface of the belt 46. When the lug 64 ejects a liner plate off the belt and onto the platen at the end of its travel, the lug travel is reversed in an upward position to its original position as in FIG. 1. The shaft 42 is driven by the hydraulic motor 66 and gear reduction box 68 both mounted on the bracket 70 secured to sidewall 22 all for driving the belt 46.

BOOM

The numeral 72 designates a telescopic boom which includes the hollow rear section 74 composed of the spaced lower and upper plate walls 76 and 78 connected to the spaced side walls 80 and 82. Secured to the rear ends of the side walls 80 and 82 are a pair of trunnion plates 84 and 86 through which the shaft 88 extends. The shaft 88 also extends through a pair of head plates 90 and 92 secured to the head block 94 forming part of the head assembly H. The head plates 90 and 92 are reinforced by the back plate 96 connecting the two. Each of the trunnion plates 84 and 86 have depending therefrom a lug 98 to which the pin 100 is connected. Connected to the pin 100 is the piston 102 of the hydraulic cylinder 104 connected to the pin 106 whereby the boom section may be pivoted to place the bolts on a liner plate into bolt holes in the drum.

Also forming part of the head assembly H is the shaft 108 connected at one end to the head block 94 and rotatably supported in the bearings 110 and 112 connected to the front plate 24 and the rear plate 26, respectively. A retaining nut 113 is secured to the outer free end of the shaft 108.

Formed on the shaft 108 are a pair of spaced gears 114 and 116 which engage a pair of spaced racks 118 and 120, respectively. The rack 120 has formed on each end thereof a piston 122 and 124. Secured to and between the front and rear plates 24 and 26 are the spaced support plates 126 and 128, and mounted on and extending through openings 130 and 132 of support plates 126 and 128 is the cylindrical rack housing 134 formed with the opening 136 through which the gear 116 extends. Opposite the gear 116 is the bearing 138 secured by bolts 140 to the inner surface of the rack housing 134 for support of the rack.

Attached to one end of the rack housing 134 is the cylinder 142 in which the piston 122 is mounted and on which is mounted the hydraulic port 144. It will be seen that the cylinder 142 extends through the opening 146 of plate 23. Attached to the other end of the rack housing 134 is the cylinder 148 in which the piston 124 is mounted and on which is mounted the hydraulic port 150. The cylinder 148 extends through the opening 152 of the plate 22.

The gear 114 and rack 118 are supported and actuated by identical structure which supports and actuates the gear 116. The pistons and gears are actuated by conventional hydraulic systems connected to the cylinders, but not shown. The racks 118 and 120 are actuated in unison whereby the shaft 108 is rotated through the gears 114 and 116 thereby rotating the boom assembly 72.

The boom 72 further includes the center section 154 tubular in cross section and of a size to slide within the rear section 74. Further provided is the end boom section 156 tubular in cross section and of a size to slide within the center section 154. Further provided for telescoping the center and end boom sections is the piston rod 158 connected at its rear end to the pin 160 connected to the rear end of the boom section 74. The piston rod 158 is connected at its outer end to the piston 162 positioned within a first hydraulic cylinder 164. A second cylinder 166 is provided which is joined with the first cylinder 164 and anchored to the center section by a pin 168 extended through the lug 170 and affixed to the cylinder. Positioned within the cylinder 166 is the piston 172 connected to the piston rod 174 which is connected at its outer front end to the pin 176 which in turn is connected to the end boom section. The diameter of the rod 174 is less than the diameter of the rod 158 and the piston 172 is less diameter than piston 162.

The rod 158 has formed therein the first passageway 178 connected at its inner end to the alternate supply-return port 180. The passageway 178 extends through the piston 162. Also formed in the rod 158 is the second passageway 182 the outer end of which terminates at a point adjacent the piston 162 on the rod side of the piston, the inner end of the passageway 182 terminating at the inner end of the rod and connected to the second supply return port 184.

The forward end of the cylinder 164 is formed with the port 186 connected to line 188, line 188 also connected to port 190 at the inner end of cylinder 166. The rear end of cylinder 164 is formed with port 192 connected to line 194 with the other end of line 194 connected to port 196 formed on the front end of cylinder 166.

With fluid pressure introduced through port 180 into passageway 178 and thence to the front side of piston 162 and through line 188 to the rear side of piston 172, cylinder 164 and center boom section 154 connected thereto are moved outwardly without movement of the second cylinder 166 due to the fact that the piston 162 is larger in diameter than piston 172. When the cylinder 164 has been moved to the extent of its travel then continued fluid pressure moves the smaller piston 172 which moves the pin connection 176 to end boom member 156 outwardly thereby moving the end boom section 156 outwardly of the center section 154. As a result the boom 72 is in its fully extended position with intermediate extended positions obtained by conventional valving mechanism not shown.

To telescopically withdraw the end and center boom sections fluid pressure is introduced through port 184 through passageway 182 to the rear side of piston 182 and at the same time to the front side of piston 172 via line 194. As a result the rod 174 is moved rearwardly into the cylinder 166 prior to movement of the piston 162 due to the greater net piston area of piston 172 (piston area minus rod area) compared to the net piston area of piston 162. When the piston 172 attains its most rearward travel then continued pressure moves the cylinder 164 rearwardly and the center boom section connected thereto, with both the end and center sections telescoped into the rear section.

PLATEN ELEVATING ARM AND PLATEN

The numeral 194 designates platen elevating arm which includes the plate 196 removably connected to the plate 198 connected to the outer end of the end boom section. Secured to the plate 196 is secured a pair of housing walls 200 and 202. Mounted in an opening in each wall is a bearing 204 and 206, respectively, and mounted in the bearings for rotation is the shaft 208. Keyed to the central portion of the shaft 208 is the gear 210 mounted between the plates 200 and 202. The gear 210 is rotated by the rack 212 which is moved in one direction by a piston in cylinder 214 connected to the rack and moved in the opposite direction by a piston in cylinder 216 connected to the rack, such construction being substantially identical to the gear and rack shown in detail in FIGS. 8, 9, and 12.

A first hub 218 is splined to the outer end of shaft 208, and secured to the hub is a first elevating arm 220. A second hub 222 is splined to the outer end of shaft 208, and secured to the hub 222 is the second elevating arm 224. Connected to the upper end of the first elevating arm 220 is the hub 226 mounted on the pin 228 secured to the first support plate 230. Connected to the upper end of the second elevating arm 224 is the hub 232 mounted on the pin 234 secured to a second support plate 236.

The numeral 238 designates a base plate secured to the top edges of the support plates 230 and 236, particularly FIG. 3. A circular ball bearing 240 is provided which includes a circular outer race 242 secured to the base plate 238 by bolts 244 together with the inner race 246 mounted on the outer race 242, the balls thereof rotatably locking the races together. Secured to the inner race 246 is the platen plate 248 and extending from the underside of the platen plate 248 is the bracket 250 connected to the end of the cylinder 252. Extending from the cylinder 252 is the piston rod 254 connected to lever arm 256 connected to circular base plate 238, particularly FIG. 1. Thus as the cylinder 252 is hydraulically actuated by conventional means not shown, the platen plate 248 is rotated on bearing 240 in either direction.

Connected to plates 230 and 236 by means of the hub 258 mounted on the shaft 260 connected to the plates is the piston rod 262 extending into the cylinder 264 connected at its lower end to yoke 266. The lower ends of the yoke are connected to the pin 268 mounted in the extension portions 270 and 272 of the housing walls 200 and 202, respectively.

Further provided is a first pair of spaced bearing blocks 274 and 276 which mount the pins 278 and 280 and which are bolted to the top surface of the platen plate 248. The bearing blocks 274 and 276 are mounted over the opening 282 formed in the platen plate 248. Mounted on the shaft 278 is the jaw 284 formed with the segmental gear portion 286, and mounted on the shaft 280 is the companion jaw 288 formed with the segmental gear portion 290 in engagement with the gear portion 286. The jaw 288 is formed with the extension arm 292 which is pivotally connected to the yoke 294 by means of pin 296. The yoke 294 is connected to the end of the piston rod 298 which has a piston on the inner end thereof in the cylinder 300 connected at its inner end to the bracket 302 depending from the platen plate 248. Thus, as the cylinder 300 is actuated by conventional means not shown the jaws 284 and 288 are moved to and from each other.

A second pair of jaw 304 and 306 are provided which are substantially identical to jaws 284 and 288 and are actuated by mechanism substantially identical to that actuating the jaws 284 and 288. The pairs of jaws 284 and 288 together with the pairs of jaws 304 and 306 are operated in unison by controls of the hydraulic cylinders actuating the jaws to grip lug formations on liner plates for securement to the inside of a drum for pulverizing taconite ore. The various other hydraulic cylinders shown and described herein are controlled by conventional means, not shown.

OPERATION

The device A is operated as follows. A crane is attached to the device A and the device is positioned with the boom, conveyor, and tilting arm extending into drum through an opening thereof. The support frame 20 is then anchored. A liner plate with bolts held in the holes thereof is positioned on the outer end of the conveyor belt 46 against the carrying lug 64. The boom 72 is fully retracted and the tilting arm 194 is actuated to bring the platen into elevation with the inner discharge end of the belt as shown in broken lines in FIG. 1. The belt 46 is then actuated whereby the plate is carried to and deposited upon the platen, the lug 64 forcing the liner plate off of the belt and onto slide rails and guides affixed to the platen as shown in FIGS. 15, 16, and 17. With the plate upon the platen the jaws 284 and 288 together with the jaws 304 and 306 are actuated to grip the plate and secure it upon the platen.

The boom 72 and platen carried thereby is then extended to a point within the drum. The boom is initially rotated by means of the racks 118 and 120 to align the platen radially with respect to the drum and subsequently rotated if necessary for alignment. The rotation of the boom allows placement of plates within 180 degrees of the inner surface of the drum extending from horizontal left to horizontal right. Completion of the remaining 180 degrees is accomplished by rotating the drum 180 degrees and the operation repeated. Then the platen is elevated by the arm 194 and further positioned for alignment by means of the cylinder 264 to place the bolts of the plate into holes in the wall of the drum. The platen may be swiveled to aid in alignment of the plate by means of the cylinder 252 which rotates the platen.

With the bolts in the plate in alignment with the bolt holes of the wall of the drum, the bolts are extended through the holes in the drum by actuation of the cylinder 104 which gives a radial movement of the boom and platen with respect to the drum. Nuts and washers are then applied to the ends of the bolts extending externally of the drum. The platen with a plate for the end wall of the drum may be manipulated by the mechanism herein described to position a plate for bolting to the drum end wall. The jaws 284 and 288 together with jaws 304 and 306 are released and the platen returned to the position in broken lines of FIG. 1 whereby another plate may be deposited on the platen for continuation of the operation as described or the boom withdrawn from the drum for rotation of the drum or at completion of the operation.

What is claimed is:

1. A device for positioning liner plates upon the interior surface of a drum for securement thereto comprising:
    (a) a support,
    (b) a boom mounted at its inner end on said support,
    (c) a platen for carrying a liner plate,
    (d) means for detachably attaching a liner plate to said platen,
    (e) means mounted on the outer end of said boom for moving said platen relative to said boom,
    (f) means for rotating said boom substantially on its longitudinal axis, and
    (g) conveyor means on said support for depositing a drum liner plate on said platen for alignment of the plates relative to the drum by said moving means and said boom rotating means.

2. The device of claim 1 in which said boom includes means for extending and retracting the same longitudinally.

3. The device of claim 2 in which said means for moving said platen relative to said boom includes means for translating said platen in an arcuate path.

4. The device of claim 3 in which said means for moving said platen relative to said boom includes means for tilting said platen on said mounting means.

5. The device of claim 4 in which said means for moving said platen relative to said boom includes means for swiveling said platen relative to said mounting means.

6. The device of claim 5 in which said boom includes means for pivoting said boom on said support.

7. The device of claim 1 in which said boom includes means for pivoting said boom on said support.

8. The device of claim 1 in which said means for moving said platen relative to said boom includes means for tilting said platen on said mounting means.

9. The device of claim 1 in which said means for moving said platen relative to said boom includes means for swiveling said platen relative to said mounting means.

10. The device of claim 6 in which said means for rotating said boom includes
    (a) a gear carried by said boom engaged by,
    (b) a rack carried by said support adapted to rotate said gear, and
    (c) means for actuating said rack to rotate said boom.

11. The device of claim 1 in which said means for rotating said boom includes
    (a) a gear carried by said boom,
    (b) a rack carried by said support, and
    (c) means for actuating said gear.

12. The device of claim 6 in which said means for depositing a drum liner plate on said platen includes an endless belt carried by said support and overlying said boom for depositing a liner plate onto said platen when said platen is moved to a position adjacent to and substantially level with the top elevation of said belt.

13. The device of claim 1 in which said means for depositing a drum liner plate on said platen includes an endless belt carried by said support and overlying said boom for depositing a liner plate onto said platen when said platen is moved to a position adjacent to and substantially level with the top elevation of said belt.

14. The device of claim 12 in which said belt has a lug mounted thereon for engagement with a liner plate on the belt and forcing the liner plate from the belt and onto the platen.

15. The device of claim 4 in which said means for tilting said platen includes actuating means connected to said mounting means and said platen.

16. The device of claim 3 in which said means for translating said platen in an arcuate path includes
(a) an arm pivotally connected at one end to said boom and pivotally connected at the other end to said platen, and
(b) means carried by said boom for pivotally moving said arm.

17. The device of claim 16 in which said means for pivotally moving said arm includes
(a) a gear mounted on said arm engaged by
(b) a rack mounted on said boom, and
(c) means for actuating said rack to pivot said arm.

18. The device of claim 5 in which said means for swiveling said platen includes
(a) said platen rotatably mounted on said mounting means, and
(b) means for rotating said platen.

19. The device of claim 1 in which said means for detachably attaching a liner plate to said platen includes
(a) a pair of jaws,
(b) means for moving at least one of said jaws to grip a portion of said liner plate.

References Cited

UNITED STATES PATENTS

| | | | |
|---|---|---|---|
| 3,314,525 | 4/1967 | Krause | 198—36 |
| 3,648,856 | 3/1972 | Garder et al. | 214—1 D |

ALBERT J. MAKAY, Primary Examiner

J. MANNIX, Assistant Examiner

U.S. Cl. X.R.

214—1 BD, 148